United States Patent Office

3,272,629
Patented Sept. 13, 1966

3,272,629
PHOTOSENSITIVE DIAZOTYPE MATERIALS
Henry C. Hills, Hollis, N.H., assignor to Nashua Corporation, Nashua, N.H., a corporation of Delaware
No Drawing. Filed Jan. 25, 1962, Ser. No. 168,813
1 Claim. (Cl. 96—75)

This invention relates to light sensitive recording media and more particularly concerns a copy sheet which is capable of forming photographic reproductions of printed or written matter and which can additionally receive permanent markings or indicia relative to such reproductions by means of a simple stylus instrument.

The broad practical scope of my invention is made possible through the use of a novel coating applied to suitable sheets, webs, or similar supporting members. Components within the coating composition render the ultimate coating photosensitive and adapted to form direct positive copies of master sheets. The coated film as a whole is, by its construction, capable of reacting under local stimulus of a heat or pressure type sylus to form a permanent record of occurrences relative to the photographic reproduction. One specific use of my novel copy and marking medium may be illustrated by the recording, on a copy of a map, of the travel routes of various vehicles and, for example, obtaining a permanent record of the relative terrestrial track of a vehicle or the route taken by a vessel upon the open sea. My copy sheet is particularly adapted to numerous applications of a similar nature.

As an article for commercial use and of the type generally described, that is, a sheet upon which may be printed and recorded series of reference points and related movement traces, a recording paper must necessarily furnish many desired properties. Satisfaction of the basic requirement of recording the movements of the individual under observation might, of course, be readily accomplished through the use of ordinary printed paper maps or the like in conjunction with familiar ink pen stylus recording instruments. A number of restrictions are placed upon such a system, however, included among which are limited ink supply, pen clogging, trace clarity, and other disadvantages related to the pen stylus recorder, as well as the limited availability of sufficient and proper maps, charts, or reference prints upon which recordings might be applied. An additional major disadvantage of pen drawn recording systems is the general lack of convenient and economical reproducibility of the record made.

The noted lack of versatility in reference sheet selection with ink pen recorders is somewhat resolved by the use of overlay sheets upon which trace markings are applied. Such a system might employ a single reference print or one set of such prints with thin sheets of tracing paper or the like overlaying the reference print. A major objection to overlay traces of this type obviously lies in the lack of unity of the recorded trace and the reference print and although this procedure affords some degree of reproducibility by direct positive processes the inaccuracies inherent in overlay alignment tends to diminish even this limited property.

Among the many desirable features of a sheet for use in recordings such as here described are the factors of reproducibility, integrity of chart and trace, ready response to widely available stimuli such as heat or pressure, permanence of trace, and economy.

It is an object of the present invention to provide a copy medium upon which may be impressed permanent recording traces by means of a simple application of heat or pressure.

A further object of the present invention is to provide in a single sheet a permanent, economical, and accurate means by which occurrence recordings and the like may be related directly to a variety of reference representations.

Another object of the present invention is to provide a copy medium which may be permanently marked in recording processes and which is itself capable, as a record bearing sheet, of being reproduced in direct positive copying processes.

Yet another object of the present invention is to provide a means by which a photosensitive stylus-markable recording sheet may be prepared without loss in such a sheet of vital copy image contrast.

These and other objects will become apparent as the description of my invention progresses.

In accordance with the present invention a carrier sheet or web of a material is provided with a coating which is essentially opaque with reference to incident visible light, sensitive to incident rays of light in the ultraviolet wave length range, and adapted to become essentially transparent to incident visible light as a result of locally applied heat, pressure, or a combination of heat and pressure. Such a sheet is adapted for use, for example, in the following manner. First, the sheet, which appears as a white opaque sheet by virtue of the light scattering properties of the coating, is exposed through any selectively transparent master to the direct rays of light containing a substantial portion of ultraviolet radiation. The ultraviolet rays falling upon the sheet in the selected areas corresponding to the master deactivates one of the color-forming components present in the coating and subsequent reaction of the remaining components in the unexposed areas results in the direct reproduction of the original. In the one use of my novel copy medium briefly referred to above the master print may be a navigational chart or geographical map and in this event the copy will depict, generally as a dark line copy in definite contrast to the white sheet background, all the landmarks, reference points, and the like visible in the master print.

After completion of the development of the reference print copy the sheet is inserted as the record receiving medium into any one of a number of various recording instruments which operate in the manner whereby impressions are made upon the recording sheet by an integral contact point or stylus bearing directly upon a surface of the sheet. The contact point may, depending upon the sensitivity of the coating, be at ambient temperature and function primarily by the pressure it exerts upon the coating or it may be heated to improve the response of the coating to its contact. In any event the coating upon the sheet is reduced in opacity under the local contact of the stylus as a result of a fusing, compacting, or other manner of collapse, as will hereinafter be discussed in more detail, with a consequent transparentizing or loss of whiteness of the coating. As a result of movement of the stylus coincident with the movement of the observed vehicle in relation to the depicted terrain the coating is permanently marked with a transparent trace of the track of the vehicle. A sheet marked in this manner when viewed under incident light appears to bear a darker reference print and recorded trace in contrast to the white background of unmarked coating. The lower reflectance of the transparent trace causes the trace to appear darker than the background and results in a contrast comparable in degree to that of the reference print.

One of the outstanding advantages of this novel sheet lies in the fact that when the carrier web for my unique coating composition comprises a material substantially transparent to ultraviolet radiation a completed record, as described above, is easily and effectively reproducible in a direct positive process, such as the diazotype process, due to the fact that a contrast in transparency exists between the reference print and the recorded trace. This contrast enables the record sheet to be used as a master for heavier or more durable diazotype copies of the record. In addition and of outstanding practical significance is the fact that the first record may be used as a master for preparing a second recording sheet upon which a second trace may be impressed in direct relation to the first trace and reference chart. Additional related traces may similarly be applied and reproduced as are required.

A copy sheet of the broadly desirable advantages noted above may be prepared according to my present invention by physically incorporating into a coating of a light-scattering cellular structure the photosensitive color-forming components of a diazotype color reaction, namely a stabilized combination of at least one diazonium compound and an azo dye coupler compound along with other beneficial components of such a system as are well known in the art.

A highly reflective coating of cellular structure in which the color components are contained may be prepared by means of a process comprising the steps of forming a water-in-oil emulsion wherein the external phase is a solution of an organic thermoplastic film-forming resin, coating the emulsion thus prepared on a suitable support or carrier sheet, and evaporating the liquids of the emulsion in proper sequence to ensure the formation of the resin film before the complete evaporation of the internal phase liquid in order to provide a series of voids or cells within the coating. The specific procedures for the preparation of such a coating are discussed by Rosenthal in U.S. Patent #2,739,909.

I have found that if an aqueous solution of the stabilized photo-sensitive dye-forming components of the familiar diazotype process coating is dispersed as the internal phase in the coating emulsion composition the final coating obtained upon drying will resemble that described by Rosenthal, having a definite cellular structure and exhibiting relatively high brightness per unit thickness, and will additionally have contained within the individual cells of the coating structure the photosensitive color-forming composition. As a result of this procedure the diazo materials are distributed throughout the volume of the coating in an extremely intimate dispersion within the matrix of the thermoplastic resinous material and any variation in concentration of the diazo materials within a particular area of the coated film is in direct proportion to the size of the coating cells in the area since both the amount of diazo materials and the size of the cell are dependent upon the size of the droplet of aqueous solution originally occupying the cell space. It is in this dependent relationship that I have discovered a truly unique property in the coating of my present invention.

It is well known in the graphic arts that clarity, detail, and sharpness of image are dependent upon the contrast of such an image in relation to its surrounding or background areas. The contrast of an image results from its density in comparison to the density of the background areas and may be varied by increasing the density of image upon a constant density background or by maintaining a constant density image upon a background of decreasing density. In the present instance and for the sake of this discussion I am concerned primarily with the contrast obtained by related dark and light rather than with chromic contrasts resulting from image and background of substantially different color. The copy image contrast of the sheets embodying the present invention is usually obtained from the variance in density of a single color over the sheet resulting preferably in a darker image upon a lighter background. The ultimate in copy contrast is, of course, black upon a white background and because of the effective light-scattering properties of the cell structure coating the background of my sheet more nearly approaches the optimum white.

Although the droplets of diazo solution are all reduced to sizes in the microscopic range during their dispersion within the external lacquer phase of my coating emulsion the actual range of droplet sizes varies to a relatively broad degree. In the normal coating procedures employed in the final preparation of my novel sheet, or in fact any sheet coated with a dispersion of various sized particles, the arbitrary distribution of the droplets in the emulsion upon the base sheet necessarily results in occasional concentrations, over the coating surface, of larger or smaller droplets. The resulting voids or coating cells remaining after careful evaporation of the aqueous vehicle are necessarily similarly concentrated. The brightness or whiteness of the ultimate image background of a cellular coating depends, as does this property of any whitening coating, upon the degree of heterogeneity which can be achieved within the coating. That is, the whiteness of a coating depends upon the amount of light-scattering which can be obtained from the particular structure of the coating. While particulate coatings such as pigment dispersions or precipitated "blushed" lacquer rely upon the multi-faceted solid particles in the coatings to scatter the incident illumination, the cellular coating employs the refractive effect of the innumerable air "particles" dispersed within the coating. The greater heterogeneity is obtained, therefore, when the cells of the coating are smaller and because of this fact concentrations of such smaller cells result in areas of greater brightness. Conversely, of course, concentrations of larger cells result in areas of less whiteness.

Thus, it is apparent that one of the factors controlling the contrast of a copy image, that is the background whiteness, is for all practical purposes dependent upon the varying size of emulsion droplets and cell size. A constant density image, therefore, impressed upon such a variable whiteness background will result in an inaccurate copy of falsely varying contrast.

As is well known, the image resulting from a diazo process by the reaction of the diazonium compound with the coupler compound to form an azo dye varies in density with the concentration of the active diazo dye-forming components. This concentration of active components is generally controlled by two factors. First, the concentration per unit area of the sheet is originally determined by the amount of coating solution applied to the surface of the sheet and, secondly, the concentration of active components at the time of coupling to form the dye image is determined by the amount of dye-forming materials unaffected by the selective intensity deactivating ultraviolet light directed upon the surface of the sheet during exposure to the image copy master. The latter of these two factors is the variable which alone should control the variations in density and the resulting contrast in the copy image if the copy is to be a true representation of the original master image.

The preparation of the familiar type of diazo copy sheet can be accomplished by simply applying a coating of a solution of azo dye-forming materials, effectively stabilized with buffering components, to a base sheet, usually a white paper carrier sheet. In this manner a uniform concentration of dye-forming materials is distributed over the entire area of a carrier sheet of constant brightness. The resulting image contrast of such a uniform combination is, therefore, effected only by the illumination of the photosensitive coating through the master and accurate copies of the original are ensured.

The basic problem in incorporating a photosensitive material such as a mixture of azo dye-forming components into a sheet with a heat or pressure sensitive background coating is due primarily to the unbalance, as previously shown, between the background whiteness and the original concentration of color-former. In order to maintain the proper balance of color-former concentration and background whiteness in the preparation of a two coat sheet it would be necessary to apply the photosensitive coating in such a selective manner that the less bright background areas receive a greater concentration of color-former and, on the contrary, that the brighter areas receive less. In this way the resulting overall image contrast balance would be maintained upon coupling by forming a denser image in areas of less bright background, other things such as ultraviolet exposure being equal.

The practical restrictions upon a system for top-coating the diazo material in such a selective manner make any such system unfeasible; however, I am able, by means of my novel coating composition, to apply the azo dye-forming materials in a single coating in concentrations varying inversely with the brightness of the background and thereby maintain a proper contrast balance. My coating process deposits more diazo material in the less bright areas formed by the larger cell-forming solution droplets and, in effect, automatically compensates for background brightness variations and maintains a constant balance of image contrast.

After a copy of a map, chart, or other reference sheet has been made upon a sheet embodying the present invention the cellular structure of the thermoplastic matrix of the coating may be used to advantage as a recording medium for stylus inscriptions. As heretofore briefly noted the stylus of the particular recording instrument used creates a transparency in the cellular coating which results in turn in a contrasting mark upon the background. Whether resulting directly from pressure or a combination of heat and pressure furnished by contact with the stylus the transparency is occasioned by the collapse of the delicate cell walls with the result that the entrapped air in the cells escapes and the heterogeneity of the coating film is destroyed. The bulk of the air filled film is reduced by this compression in the selectively marked areas and the transparency of the thin, comparatively solid film of thermoplastic resin results in a permanent contrasting mark.

The principles of my present invention may be more clearly set forth in the following representative examples. From these examples, it is anticipated, there will be suggested to those skilled in the art innumerable variations of ingredients, materials, and the like which in themselves do not here constitute a part of this invention. Such variations in formulation may be performed through the application of non-inventive skills and are not anticipated to represent a substantial deviation from the present teaching.

*Example I*

A lacquer solution was prepared containing:

| | Parts |
|---|---|
| Ethyl cellulose (100 cps., std. ethoxy) | 26.1 |
| Coumarone-indene resin (M.P.150° C.) | 12.9 |
| Sorbitan sesquioleate | 1.2 |
| Toluol | 459.8 |

The materials used in preparing the lacquer solution were obtained commercially under the tradenames Ethocel (ethyl cellulose), Nevindene R-3 (coumarone-indene resin), and Arlacel C (sorbitan sesquioleate emulsifier). A commercial grade toluol was also used. A second solution containing the photosensitive diazo components was prepared of the following materials:

| | Parts |
|---|---|
| Deionized water | 360 |
| Methyl alcohol | 4 |
| Ethylene glycol | 24 |
| Citric acid | 8 |
| Thiourea | 20 |
| Zinc chloride | 20 |
| Saponin | 0.2 |
| 2,3-dihydroxynaphthalene-6-sodium sulfonate | 7.2 |
| p-Diazo-N-ethyl-N-hydroxyethylaniline–½ zinc chloride | 6.0 |

The coating composition was then prepared by slowly adding with rapid stirring 100 parts of the aqueous diazo solution diluted with 50 parts deionized water to 150 parts of the lacquer solution. The emulsion thus formed was passed through a homogenizer to further reduce the size of the aqueous solution internal phase droplets and the resulting composition was coated to obtain a dry weight of three pounds per ream (24 x 36–500) on a sheet of one mil polyester (Mylar) film.

The coated sheet obtained was exposed through a selectively transparent master to ultraviolet light and upon subsequent exposure to moist ammonia vapor a dark blue copy of the master was obtained upon a white background. Selective application of heat or pressure to the copy resulted in a permanent transparent mark on the sheet.

Although most flexible web materials such as paper, metal foil, and organic resin films, except those films susceptible to damage from contact with organic solvents such as toluol, may be used as the carrier for my coating composition I prefer to use a sheet such as Mylar polyester film because of its many desirable properties of strength, toughness, dimensional stability, and transparency. The transparency of the base sheet is particularly advantageous when the original record is to be used to produce further generations of copies for similar marking.

*Example II*

When it is desired that the original record copy be used as a master for further copying the use of a more light-absorbent tone of copy, such as sepia, is employed. To produce such a sepia-toned embodiment of my invention I slowly added to 150 parts of the lacquer solution of Example I with rapid stirring 150 parts of an aqueous diazo solution containing:

| | Parts |
|---|---|
| Deionized water | 180 |
| Methyl alcohol | 2 |
| Ethylene glycol | 12 |
| Citric acid | 16 |
| Thiourea | 10 |
| Zinc chloride | 10 |
| Saponin | 0.1 |
| Resorcinol | 2.5 |
| p-Diazo-N-ethyl-N-hydroxyethylaniline–½ zinc chloride | 3.0 |

Coating, exposure to ultraviolet light, and development with moist ammonia vapors as in Example I produced a brown copy of the master sheet. Pressure from a marking stylus produced a transparent trace in the coating of the sheet and subsequent ultraviolet light exposure of a second sheet through this first sheet with ammonia development produced in the second sheet a brown copy of the dark lines of the first copy with a white line copy of the transparent trace.

I have found also that in addition to the advantages heretofore enumerated and described my coating composition provides a means for readily applying the more available and less expensive aqueous solution diazo system components to generally hydrophobic surfaces such as the preferred polyester film, metal foils, and other water-repellent resin films. Although some aqueous diazo systems have been applied to such hydrophobic surfaces and films through the use of expensive base and primer coatings the non-polar properties of the body of my coating composition through its organic solvent external phase provides a simple and efficient adherence to these films. Through the use of my invention it is now possible to make use of the transparency and dimensional stability of resin films as base sheets for aqueous-borne photosensitive compositions simply and without relying upon costly and time consuming primer coatings.

The physical properties of my novel coating may be specifically varied to satisfy particular requirements without substantially departing from the scope of my invention. Such variations might include, for example, an increase in pressure sensitivity of the coating by the addition of suitable plasticizers or softening agents for the resinous film-forming material chosen for use as the external phase of the coating. Likewise the color of the copy obtained may be changed within broad ranges by the substitution of familiar diazonium compounds or coupler materials. In addition, because the diazo dye components are contained within the minute cells in the resin coating, the image is physically protected from mechanical injury and chemical effects. In marking, the stylus contacts a resin surface, and is essentially kept out of contact with the diazo compounds and their decomposition products. To the extent that these might be injurious to the stylus, such injury is avoided. Such common variations in the selection of specific ingredients will depend essentially upon personal preference and practical expedience and will in no way require the exercise of any but the normal skills of the art. In the coatings of this invention it will be noted that the diazo dye compounds occupy only a small fraction of the volume of each air cell, as there can not be so much present as would interfere with the collapse of the air cells and resulting transparentization of the film when a stylus or heat is applied. In this connection it will be noted that the solutions of diazo compounds contain only a small fraction of solid materials such that upon evential evaporation of the water during the drying step, a major fraction of the volume of the air cells is unoccupied by diazo compounds.

Having described the novel features of my present invention, I claim:

A photosensitive medium suitable for receiving inscriptions from a stylus or by the application of heat in a delimited portion of its area comprising a backing, an adherent obscuring film covering its surface which film consists of a normally substantially transparent thermoplastic resinous material and has a three dimensional cellular structure including a multiplicity of discrete microscopic or sub-microscopic enclosed voids beneath the outer surface thereof and distributed throughout the volume of the film in a major proportion of its thickness, the resinous film apart from said voids therein being substantially continuous and homogeneous, the film being normally opaque throughout its area because of its heterogeneous physical structure due to the inclusion of such voids, but adapted for local coalescense under the stylus or by the application of heat to permit release of air from said voids and collapse thereof with resultant production of a substantially homogeneous relatively transparent area disclosing the underlying surface, and a dry acid stabilized mixture of at least one photosensitive diazonium compound and a coupler compound reactive therewith to form an azo dye, said mixture being entirely contained within said voids, occupying a fraction of the volume thereof and distributed among said voids in amounts proportionate to the various volumes thereof.

References Cited by the Examiner

UNITED STATES PATENTS

| | | | |
|---|---|---|---|
| 2,405,523 | 8/1946 | Sease et al. | 96—91 X |
| 2,613,149 | 10/1952 | Unkauf | 96—91 |
| 2,618,573 | 11/1952 | Green | 117—36.8 |
| 2,739,909 | 3/1956 | Rosenthal | 260—2.5 |
| 2,939,009 | 5/1960 | Tien. | |
| 3,016,308 | 1/1962 | Macaulay. | |
| 3,032,414 | 5/1962 | James et al. | 96—75 X |
| 3,042,515 | 7/1962 | Wainer | 96—90 X |
| 3,057,999 | 10/1962 | Newman et al. | 117—36.7 X |
| 3,111,407 | 11/1963 | Lindquist et al. | 96—75 X |
| 3,173,878 | 3/1965 | Reyes | 117—36.8 |
| 3,202,510 | 8/1965 | Hollmann | 96—75 |

FOREIGN PATENTS

| | | |
|---|---|---|
| 1,041,980 | 10/1958 | Germany. |
| 858,419 | 1/1961 | Great Britain. |

NORMAN G. TORCHIN, *Primary Examiner.*

PHILIP E. MANGAN, ALEXANDER D. RICCI,
*Examiners.*

R. L. STONE, C. L. BOWERS, *Assistant Examiners.*